Nov. 3, 1964 T. T. TRUE 3,155,927
BRIDGED-T TERMINATION NETWORK
Filed Sept. 12, 1960
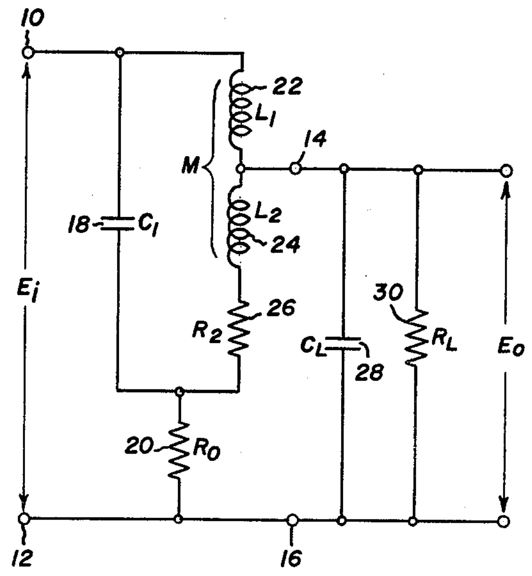
INVENTOR:
THOMAS T. TRUE,
BY Joseph Levinson
HIS ATTORNEY.

United States Patent Office 3,155,927

Patented Nov. 3, 1964

3,155,927

BRIDGED-T TERMINATION NETWORK

Thomas T. True, Camillus, N.Y., assignor to General Electric Company, a corporation of New York Filed Sept. 12, 1960, Ser. No. 55,495
4 Claims. (Cl. 333—32)

This invention relates to transmission line termination networks and, more particularly, to a bridged-T termination network providing a constant input impedance with a capacitive load.

It is often necessary to provide a network to terminate impedance over a range of frequencies when the load impedance is not a pure resistance. For example, in color television receivers, it is necessary to resistively terminate the luminance channel delay line by its characteristic impedance at all video signal frequencies. Failure to do so adversely affects the transient performance of the receiver. Since the load circuit (i.e. the circuit to which the delay line applies the signal) contains appreciable shunt capacitance, termination over the frequency range is difficult.

The art has resorted in many applications to the brute force solution of using a delay line having a very low characteristic impedance with respect to the reactance of the output load at all frequencies. However, this solution restricts the delay line to low-level operation to prevent excessive power and current requirements for the driving source. Also, the circuitry necessary to obtain adequate gain becomes overly complex.

If the characteristic impedance of the delay line is raised to simplify the driving circuitry, the shunt capacitance of the physical elements of the circuit becomes significant and reflections are obtained from the load.

The art has also employed constant resistance networks for terminating the delay line. However, with capacitive loads, the transient response and the bandwidth of the delay line circuit is degraded.

It is, therefore, the object of this invention to provide a bridged-T network for termination of a transmission line in its characteristic impedance over a wide frequency range even when feeding into a capacitive load.

In accordance with this object, there is provided, in a preferred embodiment of this invention, a network having input and output terminals. A capacitor and resistor having a resistance equal to the characteristic impedance are serially coupled across the input terminals. A first inductor, second inductor and second resistor are serially coupled across the capacitor. The inductors are wound to have a mutual linking inductance. By dimensioning the circuit elements properly, a constant input impedance over a wide bandwidth may be had with improved low-pass bandwidth and transient response.

This invention will be more clearly understood by reference to the following description taken in combination with the accompanying drawing which is a schematic diagram of a preferred embodiment of this invention.

In the figure there is shown the bridged-T termination network having input terminals 10, 12 and output terminals 14, 16. Capacitor 18 and resistor 20, equal in impedance to the characteristic impedance of the network, are serially coupled across the input terminals. Inductors 22, 24 are serially coupled with resistor 26 across the capacitor 18. The aiding mutual inductance between inductors 22, 24 is represented by M. The load, represented by capacitor 28 and resistor 30, is coupled across the output terminals 14, 16.

In a bridged-T network as commonly represented in block form, two impedances $Z_1$ and $Z_2$ are serially coupled in the cross of the T between an input and output terminal. A third shunt impedance $Z_3$ is coupled between a junction of $Z_1$ and $Z_2$ and a line coupling another input terminal and another output terminal. A fourth bridging impedance $Z_4$ is coupled is shunt with the series coupled impedances $Z_1$ and $Z_2$. The elements of the drawing may be represented in this form. $Z_1$ includes $C_1$; $Z_2$ includes $L_2$ and $R_2$; $Z_3$ includes $R_O$; and $Z_4$ includes $L_1$.

The circuit may be analyzed by selecting an output load impedance including $R_L$ and $C_L$, by assuming a resistive input impedance $R_O$ and by analyzing the circuit by ordinary methods to determine the component values.

The circuit component values are determined in accordance with Equations 1, 2, 3, and 4.

Equation 1:

$$L_1=\left\{\frac{C_L R_O R_L}{\frac{R_L}{R_O}-1}\left[1-\frac{R_L}{R_O}+\sqrt{\frac{R_L}{R_O}\left(\frac{R_L}{R_O}-1\right)}\right]-M\right\}$$

Equation 2:

$$L_2=\left\{\frac{C_L R_O R_L}{\frac{R_L}{R_O}-1}\left[\frac{R_L}{R_O}-\sqrt{\frac{R_L}{R_O}\left(\frac{R_L}{R_O}-1\right)}\right]-M\right\}$$

Equation 3:

$$R_2=R_O\left(\frac{1}{\frac{R_L}{R_O}-1}\right)$$

Equation 4:

$$C_1=\frac{1}{R_O^2}\left(\frac{L_a L_b}{L_a+L_b}-M\right)$$

Where $L_a=L_1+M$
$L_b=L_2+M$

The mutual inductance is left arbitrary in the equations. Each value of M corresponds to a particular combination of network component values. The value of M does not affect the input resistance characteristics but it does determine the low pass transfer characteristics. Normally, M is in the range $$0\leqq M\leqq\frac{R_O C_L}{6}$$

The equations are valid in the region $$1<\frac{R_L}{R_O}\leqq\infty$$

However, as the ratio $R_L/R_O$ approaches unity, the component values become impractically large. Therefore, the circuit is most useful in the region $$2\leqq\frac{R_L}{R_O}\leqq\infty$$

By way of illustration, but not by way of limitation, a termination was constructed with the component values given in Table I.

*Table I*

| Component | Numerical Designation of Figure | Value |
|---|---|---|
| $R_O$ | 20 | 2K ohms. |
| $C_L$ | 28 | 50 $\mu\mu$f. |
| $R_L$ | 30 | 5.1K ohms. |
| $R_2$ | 26 | 1,300 ohms. |
| M | | 42 $\mu$h. |
| $L_1$ | 22 | 94 $\mu$h. |
| $L_2$ | 24 | 137 $\mu$h. |
| $C_1$ | 18 | 6 $\mu\mu$f. |

The measured performance from the termination was:

Input impedance: 2K ohms flat
Output bandwidth: 3.5 mc. at 3 db down
Output transient response: rise time ≅0.14 sec. with slight trailing overshoot The termination provides increased bandwidth, improved phase response, and improved transient response over the terminations presently employed by the art. Higher impedance delay lines may be used. Thus, the delay line driving circuitry may be simpler and more economical. Further, higher output load capacitance can be driven, allowing greater freedom in placement of the delay line since the output leads could be longer if necessary. Further, some phase compensation of previous circuits can be achieved. Thus, simpler uncompensated delay lines may be used in many applications.

This invention may be variously modified and embodied within the scope of the subjoined claims.

What is claimed is:

1. A termination circuit to terminate a transmission line in its characteristic impedance when feeding a capacitive load comprising: a first and second input terminal; a first and second output terminal; a capacitor and a first resistor serially coupled between said first and second input terminal; said first resistor having a resistance equal to the characteristic impedance of the transmission line; a first inductor; a second inductor; and a second resistor serially coupled across said capacitor; said first and second inductors having a mutual inductance coupling therebetween; said first output terminal being coupled to a junction between said first and second inductors; said second output terminal being coupled to a junction between said first resistor and said input terminal.

2. A circuit in accordance with claim 1 in which said first inductor has a value of $$\left\{\frac{C_L R_O R_L}{\frac{R_L}{R_O}-1}\left[1-\frac{R_L}{R_O}+\sqrt{\frac{R_L}{R_O}\left(\frac{R_L}{R_O}-1\right)}\right]-M\right\}$$

said second inductor has a value of $$\left\{\frac{C_L R_O R_L}{\frac{R_L}{R_O}-1}\left[\frac{R_L}{R_O}-\sqrt{\frac{R_L}{R_O}\left(\frac{R_L}{R_O}-1\right)}\right]-M\right\}$$

said second resistor has a value of $$R_O\left(\frac{1}{\frac{R_L}{R_O}-1}\right)$$

and said capacitor has a value of $$\frac{1}{R_O^2}\left(\frac{L_a L_b}{L_a+L_b}-M\right)$$

where $L_a=L_1+M$; $L_b=L_2+M$, M is the mutual inductance between the first and second inductors, $R_O$ is the resistance of the first resistor $C_L$ is the capacitance of the load coupled across the output terminals and $R_L$ is the resistance of the load coupled across the output terminals.

3. A circuit in accordance with claim 2 in which M is in the range:

$$0\leq M\leq\frac{R_O C_L}{6}$$

4. A circuit in accordance with claim 3 in which the ratio $R_L/R_O$ is in the range:

$$2\leq\frac{R_L}{R_O}\leq\infty$$

References Cited in the file of this patent

UNITED STATES PATENTS

| | | |
|---|---|---|
| 1,230,615 | Steinmetz | June 19, 1917 |
| 1,763,380 | Trube | June 10, 1930 |
| 2,002,216 | Bode | May 21, 1935 |
| 2,153,857 | Wheeler | Apr. 11, 1939 |
| 2,223,736 | Mertz | Dec. 3, 1940 |
| 2,337,965 | Bode | Dec. 28, 1943 |
| 2,576,329 | Bell | Nov. 27, 1951 |

FOREIGN PATENTS

| | | |
|---|---|---|
| 529,956 | Great Britain | Dec. 2, 1940 |